United States Patent [19]

Taki et al.

[11] Patent Number: 5,121,137
[45] Date of Patent: Jun. 9, 1992

[54] COLOR EXPOSING DEVICE HAVING OPTICAL MODULATOR FOR PRODUCING MODULATED LIGHT BEAMS FOR TWO OR MORE COLORS

[75] Inventors: Kazunari Taki; Yutaka Hattori, both of Nagoya, Japan

[73] Assignee: Brother Kogyo Kabushiki Kaisha, Nagoya, Japan

[21] Appl. No.: 573,806

[22] Filed: Aug. 28, 1990

[30] Foreign Application Priority Data

Aug. 31, 1989 [JP] Japan ................. 1-224880
Sep. 8, 1989 [JP] Japan ................. 1-233915
Oct. 31, 1989 [JP] Japan ............ 1-128294[U]

[51] Int. Cl.⁵ .............................. H04N 1/21
[52] U.S. Cl. ...................... 346/108; 358/75
[58] Field of Search .......... 346/108, 107 R, 160, 346/1.1; 358/75, 76, 78, 296, 300, 302

[56] References Cited

U.S. PATENT DOCUMENTS 4,562,462 12/1985 Egan ........................ 358/75
4,862,196 8/1989 Umeda et al. ............ 346/108

Primary Examiner—Mark J. Reinhart
Attorney, Agent, or Firm—Oliff & Berridge

[57] ABSTRACT

A color exposing device for imagewise scanning a photosensitive recording medium with light beams corresponding to two or more colors, respectively. The recording medium has photosensitive materials sensitive to respective bands of wavelength of the light beams, to produce images in the different colors. The device includes a light source for producing a radiation including two or more wavelength components whose wavelengths fall within the respective wavelength bands of the light beams, a color separation element for separating the radiation ito the wavelength components to provide the light beams, which are propagated along respective ligh paths, optical modulators disposed in the light paths, respectively, for modulating intensities of the light beams, according to respective color image signals, respectively, to thereby provide respective modulated light beams, and a scanning arrangement for irradiating a surface of the recording medium with the modulated light beams along a line, to produce a line of color images.

17 Claims, 12 Drawing Sheets

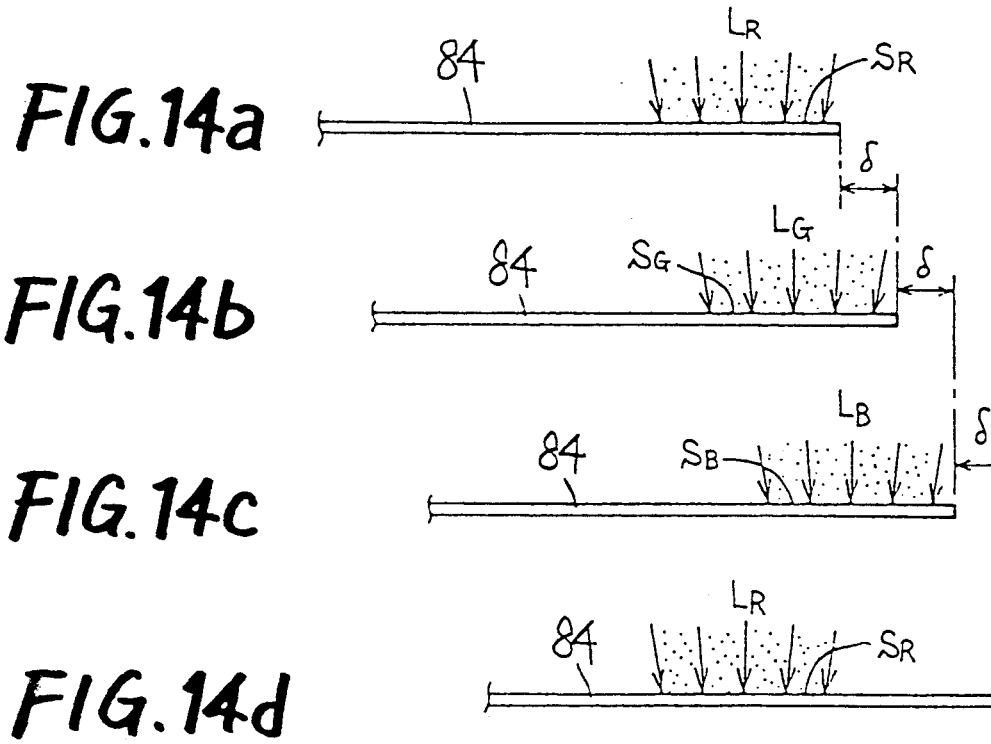
FIG.14a
FIG.14b
FIG.14c
FIG.14d
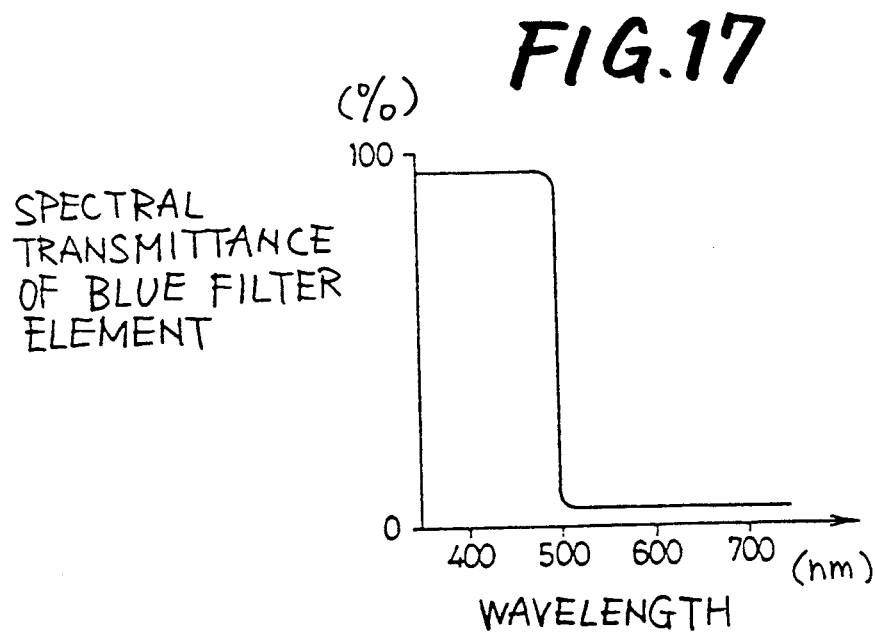
FIG.17

COLOR EXPOSING DEVICE HAVING OPTICAL MODULATOR FOR PRODUCING MODULATED LIGHT BEAMS FOR TWO OR MORE COLORS

BACKGROUND OF THE INVENTION

1. Field of the Invention

The present invention relates to a color exposing device for a recording apparatus, which is adapted to imagewise scan a photosensitive recording medium simultaneously or sequentially with two or more modulated light beams having different wavelength bands corresponding to respective colors.

2. Discussion of the Prior Art

A conventional color exposing device is shown generally at 130 in FIG. 18, wherein a photosensitive medium is imagewise exposed to three wavelength components of light corresponding to three primary colors, i.e., blue, green and red. The color exposing device 130 has three beam generators 131, 132 and 133 for generating three modulated light beams corresponding to the three primary colors of light. Each of these beam generators 131, 132, 133 includes a light source 135 such as a halogen lamp which produces an incoherent radiation in the visible spectrum, a collimator lens 136 for converging the visible radiation produced by the light source 135, and an optical modulator 134R, 134G, 134B such as an electro-optic modulator using a PLZT crystal. The optical modulators 134R, 134G, 134B receive respective color image signals representative of red, green and blue color images, and modulate the intensities of the radiations according to the received color image signals, respectively. The color exposing device 130 uses a dichroic mirror 137 which reflects only the blue component of the modulated radiation generated by the blue beam generator 131, whereby a signal-modulated light beam corresponding to the blue color is produced. The device 130 also uses a dichroic mirror 138 which reflects only the red component of the modulated radiation generated by the red beam generator 133, to thereby produce a signal-modulated light beam corresponding to the red color. These blue and red modulated light beams are incident upon a converging lens 139, with the blue light beam passing through the dichroic mirror 138. The blue and red components of the modulated radiation generated by the green beam generator 132 are reflected by the dichroic mirrors 137 and 138, respectively. That is, only the green component of the radiation from the generator 132 is transmitted through the dichroic mirrors 137, 138, as a signal-modulated light beam corresponding to the green color is received by the converging lens 139. Thus, the signal-modulated light beams corresponding to the three primary colors of light are combined into a composite exposing radiation at the converging lens 139, and is converged at an aperture 140 of a stop. The diameter of the composite exposing radiation is controlled by the aperture 140 and is focused by lens 141 on the surface of a photosensitive recording medium on a platen roll 142. Consequently, a composite scanning spot to imagewise expose a local portion of the surface of the recording medium is formed. The scanning spot is moved along a line on the recording medium parallel to the rotation axis of the platen roll 142 by a suitable beam deflecting device, as the radiations produced by the light sources 135 of the generators 131, 132, 133 are modulated according to the respective color image signals. At the end of scanning of each line on the recording medium, the platen roll 142 is rotated to scan the next line.

The photosensitive recording medium has three different photosensitive materials which are sensitive to respective bands of wavelength of the blue, green and red light beams. Accordingly, a latent image corresponding to an original image represented by the color image signals applied to the modulators 134B, 134G and 134R is formed on the photosensitive recording medium.

In the color exposing device 130 constructed as described above, the three beam generators 131, 132, 133 use the respective light sources 135. However, only the appropriate wavelength band of the radiation generated by each light source 135 is utilized. Therefore, the operating efficiency of each light source 135 is considerably low, and the exposing device 130 tends to be large-sized and expensive.

Further, it is difficult to align the optical axes of the blue, green and red modulated light beams accurately with each other when the light beams are combined into a composite exposing radiation, i.e., white light having color image information to be reproduced. This difficulty in establishing the optical axis alignment lowers the manufacturing efficiency of the device 130, and results in misalignment of the blue, green and red spots formed on the photosensitive recording medium, for example, in the scanning direction parallel to the axis of rotation of the platen roll 142.

Where a white laser light source is used in each beam generator 131, 132, 133, the output of the laser source for each of the three primary colors of light is as low as about several mW. Namely, the intensity of the used wavelength component of the white laser radiation is relatively low, whereby a relatively long time is required to expose the recording medium to the modulated light beams corresponding to the three primary colors.

The color exposing device 130 described above is adapted such that the photosensitive recording medium is simultaneously exposed to the three modulated light beams having respective wavelength bands, for each scanning line. However, each scanning line may be exposed to the three light beams sequentially or at different times while the recording medium is fed at a constant speed in the feeding direction which intersects the scanning line, normally at right angles. In this arrangement, the recording medium is irradiated along each scanning line three times, first with a light beam modulated according to the blue image signal for the line, then with a light beam modulated according to the green image signal, and finally with a light beam modulated according to the red image signal.

In the color exposing device adapted for sequential exposure of each scanning with the three modulated light beams as indicated above, however, the lines of beam spots formed with the three light beams are more or less deviated from each other in the feeding direction of the recording medium, since the recording medium is continuously fed in that direction while the position of the nominal scanning line on the recording medium is held constant, for all the three light beams. Consequently, the three scanning spots formed by the three light beams along each scanning line are not precisely matched or aligned with each other, whereby the color reproduction accuracy is deteriorated.

SUMMARY OF THE INVENTION

It is therefore an object of the present invention to provide a relatively small-sized, simple, inexpensive color exposing device for imagewise scanning a photosensitive medium, which uses two or three wavelength components of a radiation produced by a single light source.

A second object of the invention is to provide such a color exposing device which is relatively easy to manufacture in terms of the optical axis alignment of modulated light beams.

A third object of the invention is to provide a color exposing device wherein the recording medium is sequentially exposed to two or more modulated light beams corresponding to respective colors, at a predetermined time interval while the medium is fed in the feeding direction, such that the lines of scanning spots formed by the modulated light beams are superimposed on each other on the same scanning line.

The first object may be attained according to one aspect of the present invention, which provides a color exposing device for imagewise scanning a photosensitive recording medium with a plurality of light beams corresponding to a plurality of colors, respectively, the recording medium having a plurality of photosensitive materials which are sensitive to respective bands of wavelength of the light beams, to color images, the color exposing device comprising: (a) a light source for producing a radiation including a plurality of wavelength components whose wavelengths fall within the respective bands of wavelength of the light beams; (b) a color separation element for separating the radiation into the plurality of wavelength components to provide the light beams, respectively, such that the light beams are propagated along respective light paths; (c) a plurality of optical modulators disposed in the light paths, respectively, for modulating intensities of the light beams according to respective color image signals corresponding to the plurality of colors, respectively, to thereby provide respective modulated light beams; and (d) scanning means for irradiating a surface of the recording medium with the modulated light beams, along a line on the surface of the recording medium, to produce a line of color images in the plurality of colors.

In the color exposing device of the present invention constructed as described above, the radiation produced by the light source is separated into two or more wavelength components corresponding to two or more colors, respectively. The thus obtained two or more light beams are propagated along respective light paths in which the respective optical modulators are disposed to modulate the intensities of the light beams according to respective color image signals corresponding to the respective colors. The scanning means receive the thus modulated light beams, to irradiate the surface of the recording medium simultaneously with the two or more light beams, along a line on the medium, to thereby produce a line of color images represented by the color image signals.

For example, the light source produces white light which includes three wavelength components corresponding to red, blue and green colors (three primary colors of light), and the corresponding three light beams are obtained by separation of the white light by the color separation element. The light beams are modulated according to respective red, blue and green image signals, to provide three corresponding modulated light beams. In this case, the photosensitive recording medium has three photosensitive materials (yellow, magenta and cyan) which are sensitive to the three modulated light beams. Therefore, the single light source is used to expose the recording medium to the three modulated light beams, for producing each line of color images according to the image signals corresponding to the red, blue and green colors (yellow, magenta and cyan). Accordingly, the present exposing device can be made relatively small-sized, simple in construction and available at a reduced cost, as compared with the known device which uses three light sources for the respective colors.

The color separation element may comprise a color separation prism which has two or more selectively reflecting films for reflecting therefrom and/or transmitting therethrough the wavelength components of the radiation from the light source.

The modulated light beams may be combined by a suitable color combining element into a composite exposing radiation, which is propagated along a light path leading to the scanning means, so that the recording medium is irradiated with the light beams having the respective wavelength bands corresponding to the two or more colors. The color combining element may comprise a color combining prism which has a plurality of selectively reflecting films for reflecting therefrom and/or transmitting therethrough the respective modulated light beams such that the modulated light beams are combined into the composite exposing radiation.

Each optical modulator may use a PLZT (PbTiO$_3$-PbZrO$_3$-La$_2$O$_3$) crystal which exhibits an electro-optical effect when the crystal receives a color image signal.

The photosensitive recording medium may be a microcapsule type recording medium which has a layer consisting of a mixture of three groups of microcapsules corresponding to the primary colors of light. Each group of microcapsules consists of microcapsules each including a radiation-curable resin which is cured upon exposure to the modulated light beam having the appropriate wavelength band, and a chromogenic material (yellow, magenta or cyan) which is contained in the radiation-curable resin.

The scanning means may comprise a polygon mirror for reflecting the composite exposing radiation and deflecting the composite exposing radiation over a predetermined angular range along the scanning line on the recording medium. The scanning means may further comprise a f$\theta$ lens through which the composite exposing radiation reflected and deflected by the polygon mirror is transmitted so that a scanning speed of the exposing radiation is constant over the entire length of the scanning line.

The second object of the invention indicated above may be achieved according to one preferred form of the present invention, wherein the color exposing device further comprises color combining means for combining the modulated light beams into a composite exposing radiation such that the modulated light beams of the composite exposing radiation are propagated through respective light paths leading to the scanning means. In the present form of the invention, the optical axes of the light paths are offset with respect to each other so that scanning spots formed from the modulated light beams by the scanning means are offset apart from each other along the scanning line in a scanning direction of the scanning means.

The above form of the color exposing device does not require precise alignment of the optical axis of the two or more light paths from the color combining means to the scanning means, because the scanning spots formed on the recording medium may be offset or deviated from each other in the scanning direction. For example, the color combining means may use a color combining prism which has selectively reflecting films for reflecting therefrom and/or transmitting therethrough modulated light beams such that the optical axes of the light beams travelling toward the scanning means are parallel to each other and are offset from each other. Alternatively, the color combining means may use reflecting mirrors for reflecting at least one of the modulated light beams so that the optical axes of the modulated light beams intersect each other such that the modulated light beams irradiate the same area on each reflecting surface of a polygon mirror of the scanning means.

Therefore, the optical components of the color exposing device according to the above form of the invention need not be accurately assembled to assure precise alignment of the optical axes of the modulated light beams incident upon the scanning means. Accordingly, the exposing device can be manufactured with high production efficiency.

In operation of the above form of the color exposing device, suitable delay means is provided for delaying a time at which at least one of the color image signals corresponding to the two or more colors is applied to a corresponding at least one of the optical modulators, so that the scanning spots of the modulated light beams for a same local spot on the surface of said recording medium are aligned with each other at said same local spot on the scanning line on the surface of the recording medium. For instance, the delay means operates in a feedback fashion according to detector means which detects an amount of spacing or offset between the adjacent scanning spots of the modulated light beams. Namely, the detected amount represents a required delay time for aligning the otherwise offset adjacent scanning spots.

The light source used in the above form of the invention may comprise a metal halide lamp, an elliptical mirror having a focal point at the metal halide lamp, a concave lens for converting a light produced by the lamp and reflected by the elliptical mirror, into substantially parallel rays of light, a stop having an aperture, and a conical lens having a translucent projection which extends through the aperture of the stop. The conical lens receiving the parallel rays emits through the projection thereof the radiation to be incident upon the color separation element.

The third object indicated above may be achieved according to another aspect of the present invention, which provides a color exposing device for imagewise scanning a photosensitive recording medium with a plurality of signal-controlled modulated light beams corresponding to two or more colors, respectively, the recording medium having photosensitive materials which are sensitive to respective bands of wavelength of the light beams, to produce color images, the color exposing device comprising: (a) feeding means for feeding the recording medium at a predetermined constant speed in a feeding direction; (b) time-sharing modulating means for producing the signal-controlled modulated light beams at a predetermined interval which is determined by a scanning pitch between adjacent scanning lines that are spaced apart from each other in the feeding direction of the recording medium; (c) scanning means for sequentially irradiating a surface of the recording medium with the modulated light beams at the predetermined time interval, along each scanning line in a scanning direction which intersects the feeding direction; and (d) deflecting means for deflecting the modulated light beams by different angles in the feeding direction such that lines of scanning spots formed on the surface of the recording medium are superimposed on each other on the same scanning line, as the recording medium is fed at the constant speed while the surface of the recording medium is irradiated with the deflected modulated light beams at the predetermined time interval for each scanning line by the scanning means.

In the color exposing device constructed as described above, the modulated light beams are deflected in the feeding direction so that each scanning line is irradiated with all of the modulated light beams which are produced at the predetermined time interval while the recording medium is continuously fed at the predetermined constant speed. Accordingly, the scanning spots formed by all the modulated light beams for a given scanning line are aligned with each other even though the recording medium is continuously fed. Accordingly, the conventional experienced deviation of the scanning spots for different colors from the nominal spot is avoided, and the color reproduction accuracy is improved in the present color exposing device.

Further, the present color exposing device may be obtained by modifying the conventional counterpart, by simply adding the deflecting means for deflecting the modulated light beams by different angles in the feeding direction of the recording medium. Accordingly, the present device may be available at a relatively low cost. The deflecting means may be replaced by feeding means which is adapted to feed the recording medium intermittently, so that the recording medium remains at the same position until each scanning line is irradiated with all of the modulated light beams. In this case, however, the feeding means must be constructed and controlled so as to permit highly accurate intermittent feeding of the recording medium with high positioning accuracy in the feeding direction. This inevitably complicates the color exposing device, resulting in reduced durability and operating reliability and increased cost of manufacture of the device.

The scanning means may comprise a polygon mirror having a plurality of plane reflecting surfaces for reflecting the modulated light beams, respectively. The polygon mirror is rotated about an axis thereof to deflect the reflected modulated light beams along each scanning line. In this case, the plane reflecting surfaces of the polygon mirror may be inclined at different angles with respect to the axis of rotation of the polygon mirror, so that the plane reflecting surfaces serve as the deflecting means for deflecting the reflected modulated light beams in the feeding direction of the recording medium.

Where three signal-controlled modulated light beams corresponding to three colors are used, the polygon mirror may have three groups of reflecting surfaces corresponding to the three modulated light beams, each group consisting of reflecting surfaces whose number is a multiple of three. The scanning pitch in the feeding direction is substantially three times as large as a feeding distance of the recording medium which corresponds to each one of the three modulated light beams.

The color exposing device according to the above aspect of the invention may use a light source which produces a white light including wavelength components, and the time-sharing modulating means may comprise means for generating a plurality of color image signals corresponding to the wavelength components, at the predetermined time interval. In this instance, an optical modulator is provided for modulating intensities of the wavelength components according to the color image signals, respectively, at the predetermined time interval. The white light may include three wavelength components corresponding to the three primary colors, and the color image signals consist of blue, green and red image signals. The time-sharing modulating means may further comprise a color filter which has three filter elements which are selectively placed in the operating position at the predetermined time interval.

BRIEF DESCRIPTION OF DRAWINGS

The above and other objects, features and advantages of the present invention will be better understood by reading the following detailed description of presently preferred embodiments of the invention, when considered in connection with the accompanying drawings, in which:

FIGS. 14(a), 14(b), 14(c) and 14(d) are views illustrating exposing operations with red, green and blue beams along a line on a photosensitive sheet while the sheet is fed;

FIGS. 15-17 are graphs indicating spectral transmittance values of red, green and blue filter elements of a color filter used in the embodiment of FIG. 12.

DETAILED DESCRIPTION OF PRESENTLY PREFERRED EMBODIMENTS

Figure 1:
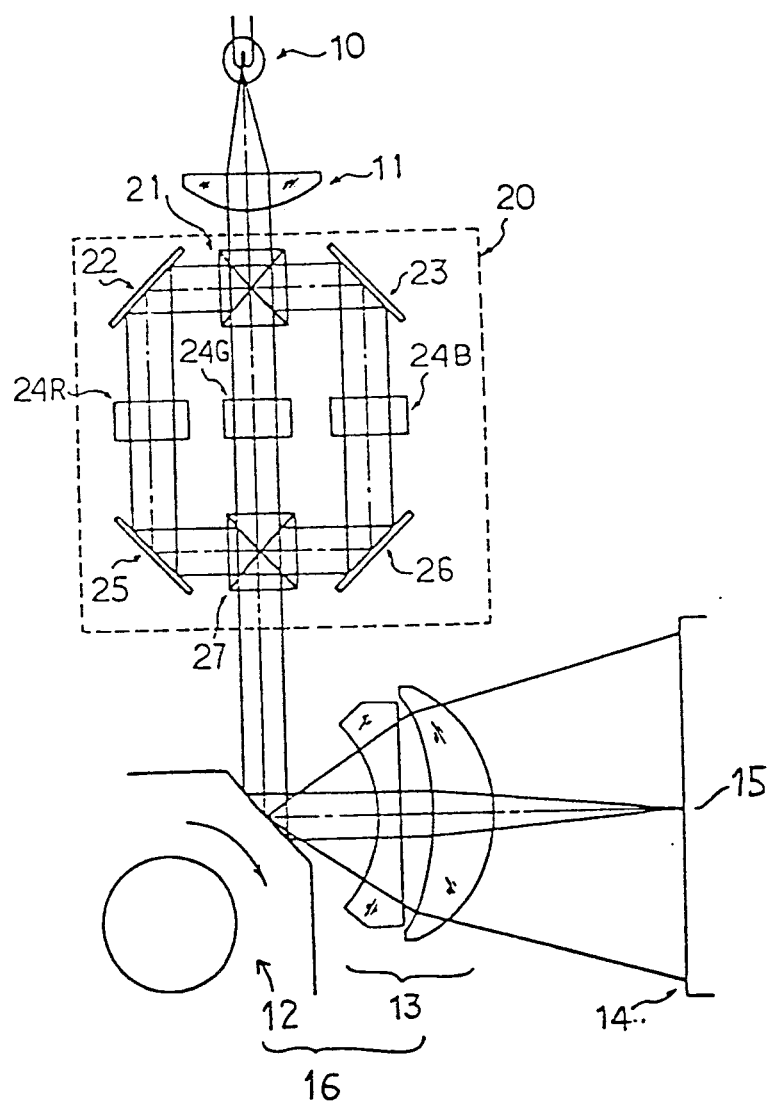
FIG. 1 is a schematic view of one embodiment of a color exposing device of the present invention for a color imaging apparatus.

Referring first to FIG. 1, there is shown a color exposing device for a color printer adapted to effect printing on a pressure-sensitive photosensitive medium 14. The color exposing device has a light source 10, a collimator lens 11, a scanning portion 16, and a color modulating portion 20. The scanning portion 16 includes a polygon mirror 12 and an fθ lens 13.

The light source 10 produces a white light including components having wavelength bands corresponding toy red (R), green (G) and blue (B) colors. The white light is converted by the collimator lens 11 into substantially parallel rays, which are incident upon the color modulating portion 20, so that the red, green and blue components of the light are modulated according to respective color image signals corresponding to the red, green and blue colors, and thus obtained three modulated light beams are combined with each other into a composite exposing radiation, which is incident upon the polygon mirror 12 of the scanning portion 16.

The polygon mirror 12 is rotated about its axis in the direction indicated by arrow in FIG. 1, at a predetermined constant angular velocity, so that the incident composite exposing radiation reflected by the polygon mirror 12 is reflected over a predetermined angular range in the plane perpendicular to the rotation axis of the mirror 12. The deflected exposing radiation is transmitted through the fθ lens and thereby focused on the surface of the recording medium 14, such that the scanning spot formed on the medium surface is moved along a scanning line at a constant speed as the exposing radiation is deflected by the polygon mirror 12 over the predetermined angular range, which covers the effective width of the recording medium 14.

Figure 2:
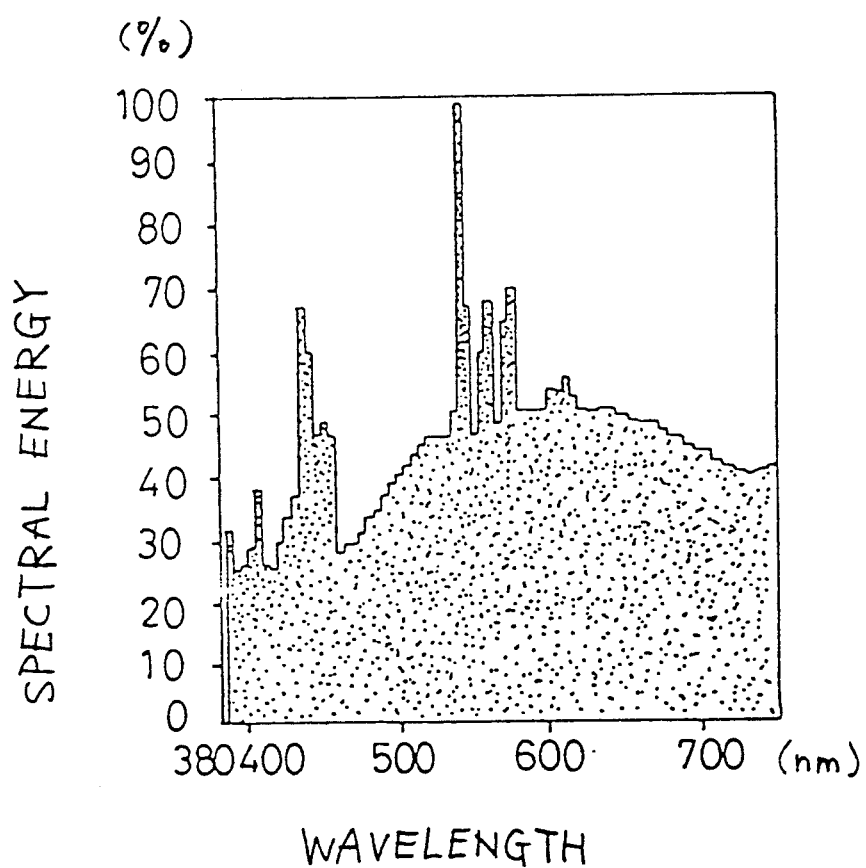
FIG. 2 is a view showing an output characteristic in terms of spectral energy distribution of a metal halide lamp used in the color exposing device of FIG. 1.

The light source 10 consists of a metal halide lamp, for example, which produces a white light, i.e., visible spectrum of light having a spectral energy distribution over a wavelength range between 400 nm and 700 nm, as illustrated in FIG. 2.

Figure 3A:
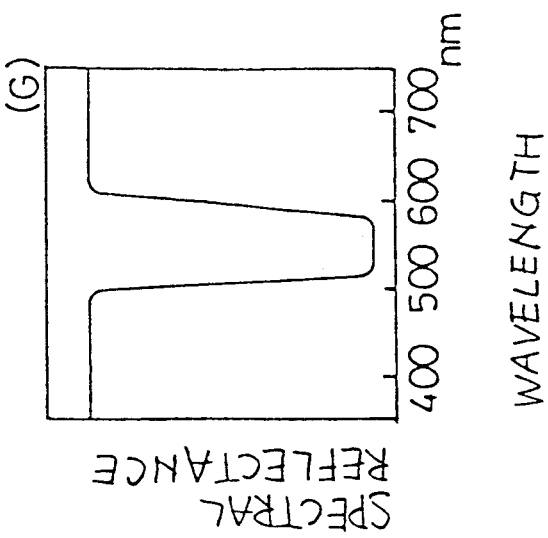
FIGS. 3(a), 3(b) and 3(c) are graphs illustrating spectral reflectance values of selectively reflecting films of a color separation prism used in the device of FIG. 1.
Figure 3B:
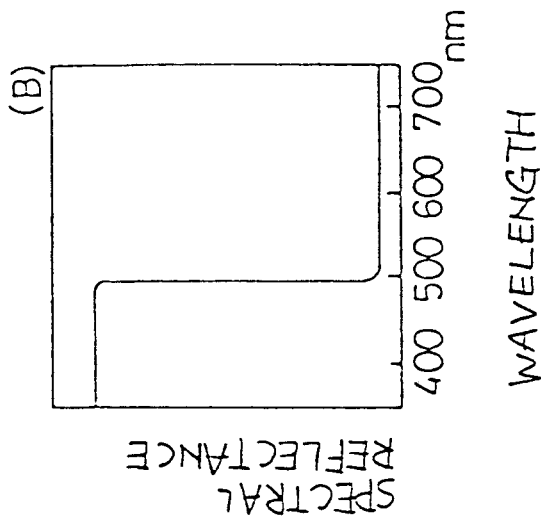
Figure 3C:
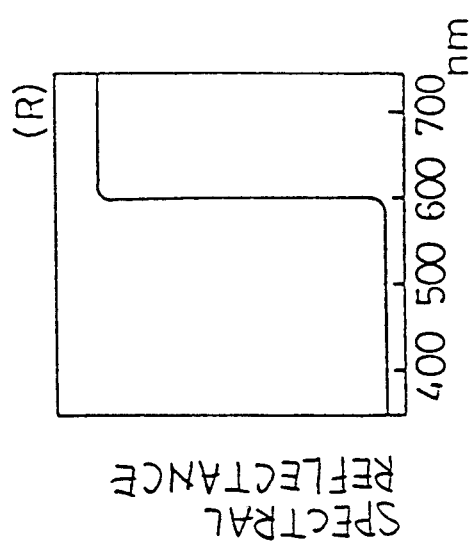
Figure 4:
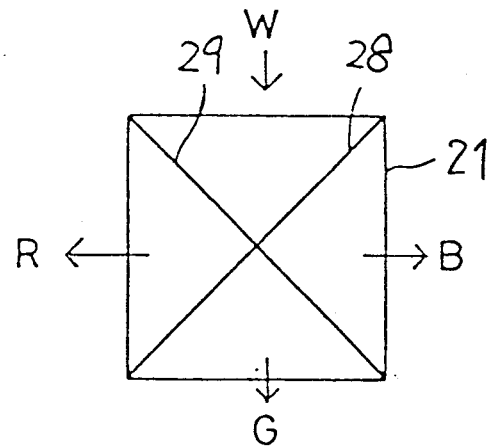
FIG. 4 is a view showing the selectively reflecting films of the color separation prism indicated above.

The color modulating portion 20 includes a color separation prism 21, reflecting mirrors 22, 23, 25 and 26, a color combining prism 27, and three optical modulators 24R, 24G and 24B. As shown in FIG. 4 in detail, the color separation prism 21 has two selectively reflecting films 28 and 29, which selectively reflect therefrom or transmit therethrough the wavelength components of the white light W received from the collimator lens 11. More specifically, the reflecting film 28 has a spectral reflectance distribution as indicated in FIG. 3(a), and therefore reflects only the component having the red wavelength band (red light beam), to the left as indicated at R in FIG. 4. On the other hand, the reflecting film 29 has a spectral reflectance distribution as indicated in FIG. 3(b), and therefore reflects only component having the blue wavelength band (blue light beam), to the right, as indicated at B in FIG. 4. Further, the two selectively reflecting films 28, 29 have a resultant spectral reflectance distribution as indicated in FIG. 3(c). Accordingly, the remaining component of the white light, that is, the component having the green wavelength band (green light beam) is transmitted through the two reflecting films 28, 29, as indicated at G in FIG. 4. Thus, the red, green and blue components R, B, G of the white light W are separated from each other, and propagated along respective light paths through the modulating portion 20.

The red light beam reflected by the reflecting film 28 of the color separation prism 21 is reflected by the reflecting mirror 22 toward the optical modulator 24R, while the blue light beam reflected by the reflecting film 29 is reflected by the reflecting mirror 23 toward the optical modulator 24B.

The optical modulators 24R, 24G and 24B are disposed in the three light paths, respectively, to modulate the intensities of the incident light beams according to the red, green and blue image signals, respectively, which signals are received from a suitable device. Each optical modulator 24 may use a PLZT (PbTiO$_3$-PbZrO$_3$-La$_2$O$_3$) crystal which exhibits an electro-optical effect when an image signal in the form of a voltage signal is applied to the crystal.

The red and blue light beams modulated by the modulators 24R and 24B are reflected by the mirrors 25, 26, toward the color combining prism 27, respectively. The color combining prism 27 is similar in construction to the color separation prism 21, but is differently oriented such that the three modulated light beams are reflected by or transmitted through the reflecting films in the downward direction as seen in FIG. 1. Thus, the three light beams modulated by the respective modulators 24R, 24B and 24G are combined into a composite exposing radiation (white light) by the color combining prism 27.

The pressure-sensitive photosensitive recording medium 14 is a known photosensitive sheet as disclosed in U.S. Pat. Nos. 4,440,846 and 4,399,209. The former patent shows a pressure-sensitive photosensitive sheet which has a microcapsule layer and a developer layer. The microcapsule layer consists of a multiplicity of microcapsules each including a radiation-curable resin which is cured upon exposure to a certain wavelength band of a light beam, and a chromogenic material or color precursor contained in the radiation-curable resin. For example, the microcapsule layer consists of three groups of microcapsules whose radiation-curable resin are sensitive to the three primary colors of light, i.e., red, green and blue light beams, and whose chromogenic materials are capable of reacting with a developing material of the developer layer, to form yellow, magenta and cyan. The microcapsules are ruptured as by presser rolls, according to the mechanical strength which varies with the amount of exposure to the light beams, and the chromogenic materials which come out of the radiation-curable resin react with the developing material.

U.S. Pat. No. 4,399,209 shows a photosensitive sheet having a microcapsule layer as described above, which is used in combination with a separate developer sheet which has a developer layer including the developing material.

Figure 5:
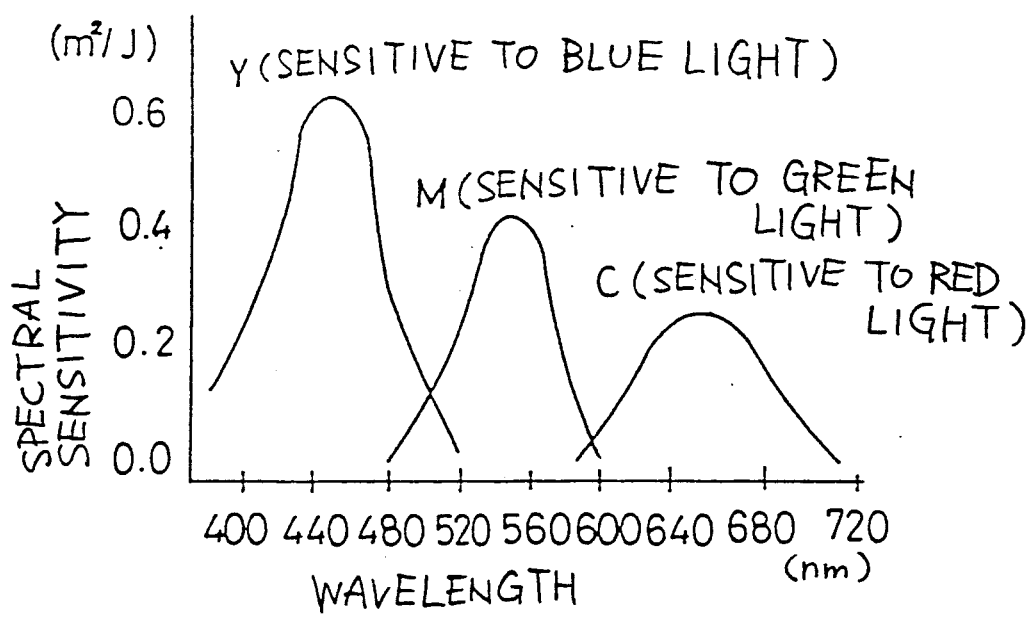
FIG. 5 is a graph indicating spectral sensitivity of a photosensitive sheet to blue, green and red colors of light.

The present color exposing device is applicable to a photosensitive sheet of either of the two types described above. FIG. 5 shows the spectral sensitivity distribution of the pressure-sensitive photosensitive medium 14 used in the present embodiment. It will be understood that the photosensitive medium 14 has maximum values of sensitivity to a blue light beam having a wavelength of about 450 nm, a green light beam having a wavelength of about 550 nm, and a red light beam having a wavelength of about 650 nm.

Figure 6:
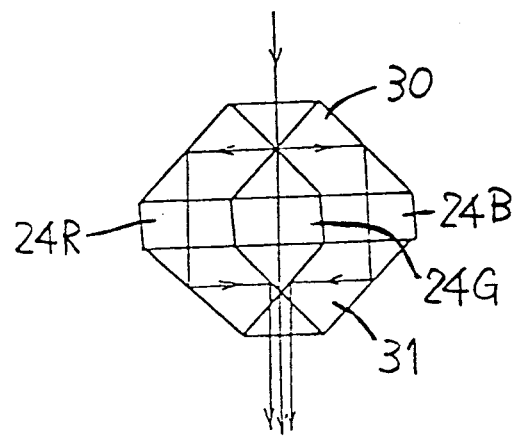
FIGS. 6 and 7 are views illustrating integral optical assemblies used as an optical modulating portion in modified embodiments of the invention.
Figure 7:
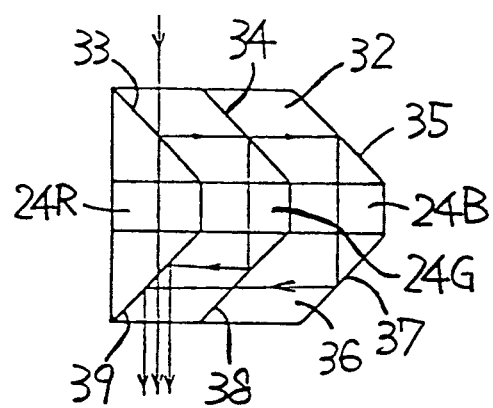

While the color modulating portion 20 of the color exposing device described above uses the optical components which are structurally separate from each other, the color modulating portion 20 may be constituted by a single integrated optical component or assembly as shown in FIGS. 6 and 7.

In the integrated optical modulator of FIG. 6, a color separation prism 30 has two selectively reflecting films which reflect the red and blue wavelength components of an incident white light and transmit the green wavelength component. The red and blue wavelength components reflected by the prism 30 are reflected by inclined surfaces of the prism 30 which are parallel to the reflecting films. The modulator also has a color combining prism 31, and an array of three optical modulators 24R, 24G and 24B disposed between the two prisms 30, 31. The red, green and blue wavelength components are transmitted through the respective optical modulators 24R, 24G and 24B, and the modulated components (modulated light beams) are received by the color combining prism 31. The red and blue light beams modulated by the modulators 24R and 24B are reflected by inclined surfaces of the prism 31 parallel to the reflecting films, which reflect the incident red and blue light beams toward the polygon mirror 12 of the scanning portion 16.

It will be understood that the integrated optical modulator of FIG. 6 utilizes the inclined outer surfaces of the two prisms 30, 31 as reflecting mirrors which define the light paths for the red and blue light beams. Thus, the modulator of FIG. 6 does not use exclusive reflecting mirrors (22, 23, 25 and 26) as used in the preceding embodiment of FIG. 1.

In the integrated optical modulator of FIG. 7, a color separation prism 32 has a first selectively reflecting film 33 for transmitting only the green wavelength component of the incident white light and reflecting the red and blue wavelength components in the right direction (as viewed in FIG. 7), a second selectively reflecting film 34 for reflecting only the blue wavelength component and transmitting the red wavelength component in the right direction, and a third selectively reflecting film 35 for reflecting the red wavelength component in the downward direction (as viewed in FIG. 7). The first reflecting film 33 has a spectral reflectance distribution as shown in FIG. 3(c), and the second reflecting film 34 has a spectral reflectance distribution as shown in FIG. 3(b). The third selectively reflecting film 35 reflects all wavelength components of the incident light. The modulator of FIG. 7 also has a color combining prism 36 which has a fourth, a fifth and a sixth selectively reflecting film 37, 38, 39, which have the same spectral reflectance characteristics as the third, second and first reflecting films 35, 34, 33, respectively. Between the two prisms 32, 36, there is disposed an array of the three optical modulators 24R, 24G and 24B for modulating the respective red, green and blue wavelength components.

While the integrated optical modulator of FIG. 6 has a total of eight reflecting surfaces (including the reflecting films), the integrated optical modulator of FIG. 7 has a total of six reflecting surfaces (33-35 and 37-39). In this respect, the modulator of FIG. 7 is available at a comparatively reduced cost.

While the light source 10 and the pressure-sensitive photosensitive recording medium 14 has the spectral energy and sensitivity characteristics as indicated in FIGS. 2 and 5, respectively, the color exposing device according to the present invention may use a light source and a photosensitive recording medium which have spectral energy and sensitivity characteristics different from those of FIGS. 2 and 5.

In the above embodiments of FIGS. 1, 6 and 7, the optical modulators 24R, 24G and 24B are electro-optic modulators, these electro-optic modulators may be replaced by acousto-optic modulators or liquid crystal shutters.

Figure 8:
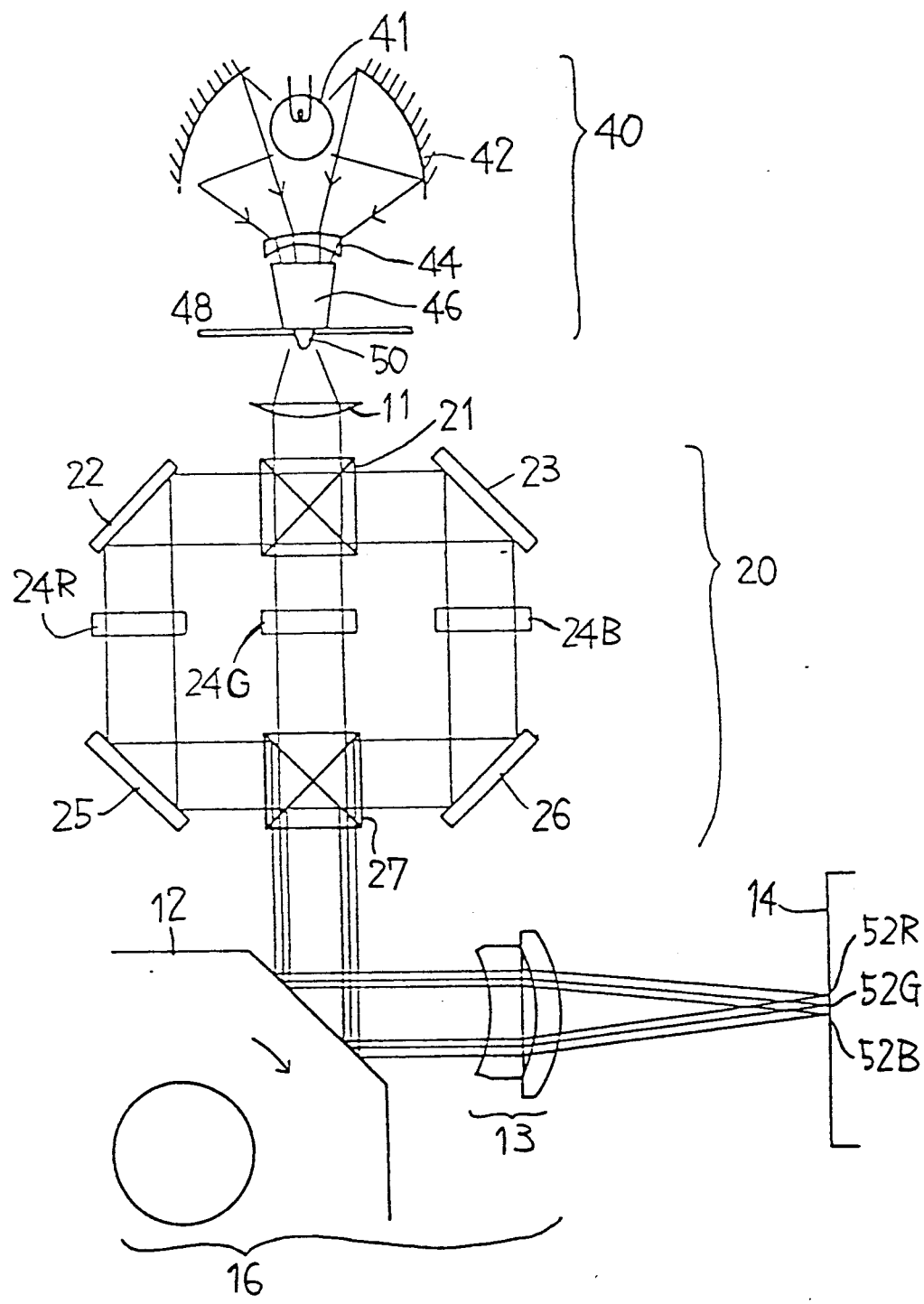
FIG. 8 is a schematic view showing a further embodiment of the color exposing device of this invention.
Figure 9:
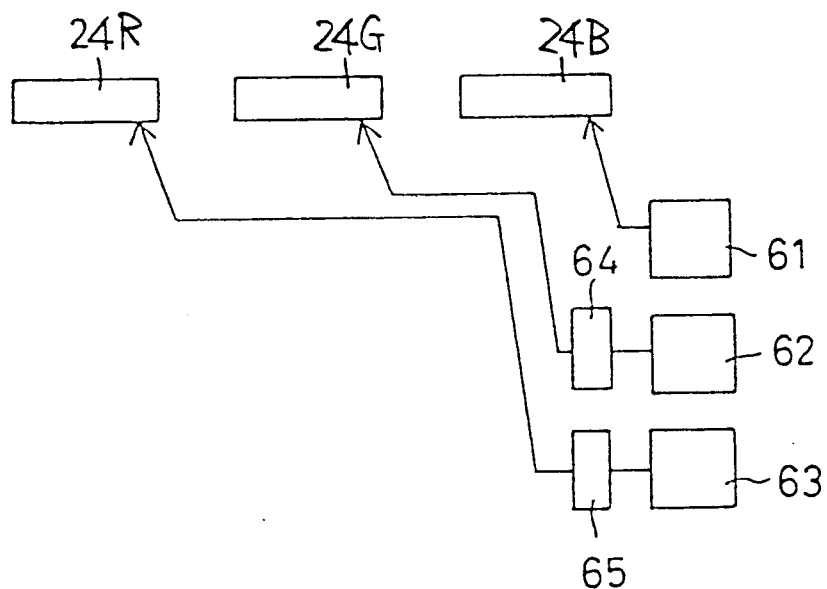
FIG. 9 is a view illustrating an optical modulating arrangement used in the embodiment of FIG. 8, which includes delay means.
Figure 10:
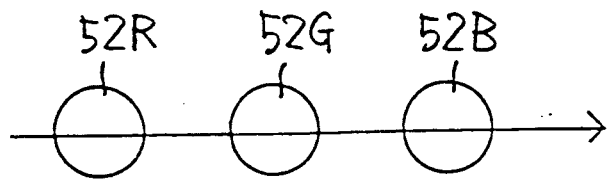
FIG. 10 is a view indicating scanning spots formed by red, green and blue beams along a scanning line in the embodiment of FIG. 8.

Referring next to FIGS. 8-10, there will be described a further embodiment of the present invention. In the interest of brevity and simplification, the same reference numerals as used in the first embodiment of FIG. 1 will be used in FIGS. 8 and 9 to identify the corresponding components.

The color exposing device of the present embodiment uses a light source device 40 which includes a metal halide lamp 41. Like the white light source 10 of the first embodiment, the metal halide lamp 41 produces a white light and has a spectral energy distribution as indicated in FIG. 2. The white light produced by the lamp 41 is reflected by an elliptical mirror 42 and the reflected light is incident upon a concave lens 44. The elliptical mirror 42 has a first focal point at the point of emission of the white light of the lamp 41, and a second focal point which is located between the first focal point (lamp 41) and the concave lens 44. The white light incident upon the concave lens 44 is converted into substantially parallel rays, which are converged by a conical lens 46. The conical lens 46 has a translucent projection 50 which extends through an aperture formed through a stop 48. In this arrangement, the converged beam is radiated from the projection 50 toward the collimator lens 11. The stop 48 is held in contact with the end face of the body of the conical lens 46 from which the projection 50 extends. The stop 48 functions to stop a portion of the beam which would be otherwise emitted from the peripheral part of the end face of the lens 46. The radiation incident upon the collimator lens 11 is converted into substantially parallel rays, which are incident upon the color modulating portion 20.

The color modulating portion 20 has the optical modulators 24B, 24G and 24R using electro-optic PLZT crystals. As shown in FIG. 9, these optical modulators 24B, 24G and 24R are adapted to receive color image signals in the form of voltage signals generated from respective voltage applying circuits 61, 62, 63 which correspond to the primary colors of light, blue, green and red. The blue, green and red wavelength components of the light incident upon the color modulating portion 20 are separated by the prism 21, and are modulated by the respective modulators 24B, 24G and 24R according to the voltage signals from the respective circuits 61-63.

While the color modulating portion 20 of the present embodiment of FIGS. 8 and 9 is similar in construction to that of the embodiment of FIG. 1, the reflecting mirrors 25 and 26 are oriented such that the optic axes of the red and blue light beams reflected by the color combining prism 27 are parallel to each other but are slightly offset or spaced apart from each other in the direction perpendicular to the optic axes. Namely, it is not necessary to accurately position the reflecting mirrors 25, 26 so that the optic axes of the red, green and blue light beams of the composite exposing radiation from the prism 27 are accurately aligned with each other.

In the present arrangement of the color modulating portion 27, the scanning spots 52B, 52G and 52R formed on the surface of the recording medium 14 by irradiation with the respective blue, green and red light beams reflected from the polygon mirror 12 are located on a scanning line and are slightly offset from each other in the scanning direction, as indicated in FIG. 10. The scanning direction is perpendicular to the rotation axis of the polygon mirror 12. In other words, the reflecting mirrors 25 and 26 are oriented such that the scanning spots 52B, 52G and 52R are located on the scanning line in mutually offset relation with each other as indicated in FIG. 9. This arrangement does not require precise adjustment of the color modulating portion 20 for accurate alignment of the blue, green and red scanning spots 52B, 52G and 52R with each other.

In operation of the color exposing device, however, all of the three scanning spots 52B, 52G, 52R for a given local spot on the relevant scanning line should be formed at that given local point, or aligned with each other. To this end, a first and a second delay circuit 64, 65 are connected to the respective voltage applying circuits 62, 63 for the modulators 24G and 24R for the green and red light beams. The first and second delay circuits 64, 65 function to delay the times at which the voltage signals (green and red color image signals) are applied to the respective modulators 24G, 24R, so that the scanning spots 52G and 52R are located on the corresponding scanning spot 52B. The delay times of the delay circuits 64, 65 are proportional to the spacings between the scanning spot 52B and the scanning spots 52G, 52R, respectively, in the scanning direction. In this respect, it is noted that the scanning speed or the speed of deflecting the composite exposing radiation by the polygon mirror 12 through the fθ lens 13 is constant over the entire length of the scanning line. The required delay times may be obtained by experimentally measuring the spacings between the scanning spots 52 when the delay circuits 64, 65 are placed in the inoperative position.

The present embodiment of FIGS. 8-10 permits sufficiently high accuracy of reproduction of color images, owing to the provision of the delay circuits 64, 65, in spite of relatively rough positioning or adjustment of the reflecting mirrors 25, 26, which allows for relatively easy assembling of the color modulating portion 20.

In the embodiment of FIG. 8, the optical axes of the three modulated light beams of the composite exposing radiation from the color combining prism 27 are parallel to each other and are offset from each other. However, the optical axes of the three light beams may intersect each other as indicated in FIG. 11.

Figure 11:
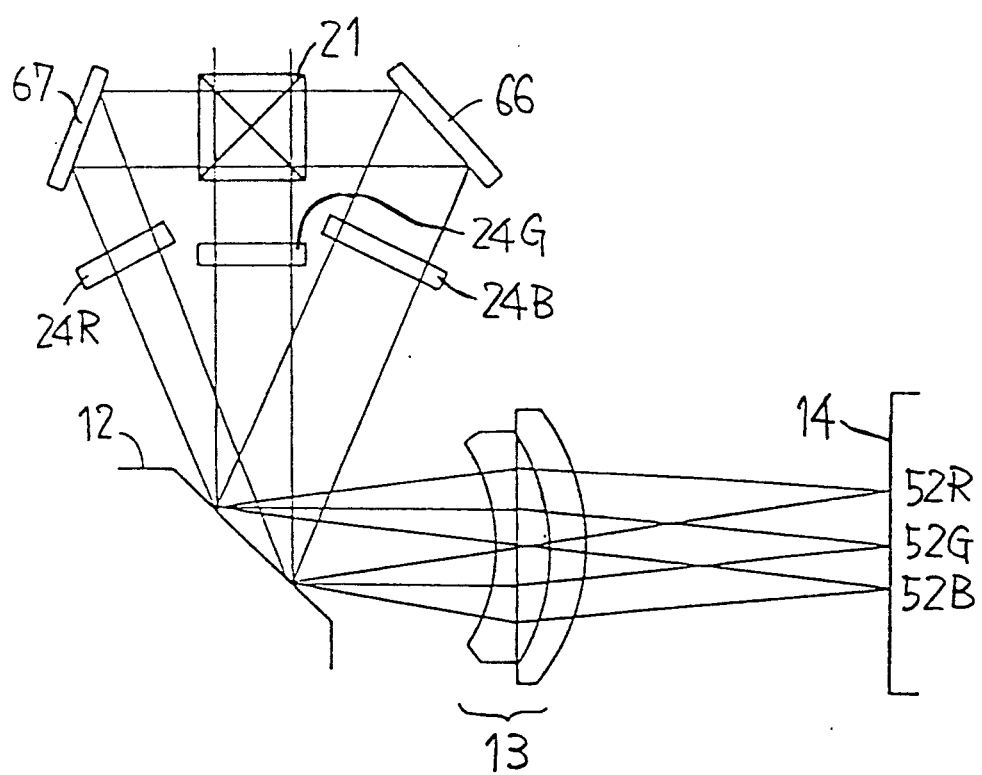
FIG. 11 is a schematic view illustrating a modification of the embodiment of FIG. 8.

More specifically, the color exposing device of the embodiment of FIG. 11 uses two reflecting mirrors 66, 67 for reflecting the blue and red wavelength components reflected by the color separation prism 21. These two mirrors 66, 67 are oriented such that the optical axes of the three modulated light beams intersect each other and such that the three modulated light beams irradiate the same area on each reflecting surface of the polygon mirror 12. In this arrangement, too, the scanning spots 52B, 52G and 52R are offset from each other along a scanning line as indicated in FIG. 10, if the delay circuits 64, 65 are not in the operative position. In the present embodiment of FIG. 11, a color combining prism as used in the preceding embodiments of FIGS. 1, 6, 7 and 8 is not provided, and the color modulating portion of the device may be accordingly simplified and available at a reduced cost.

For accurate alignment of the three scanning spots 52B, 52G and 52R with each other by the operations of the delay circuits 64, 65, it is desirable that suitable detector means is provided to detect the relative positions of the optical axes of the three modulated light beams (scanning spots 52) near the surface of the recording medium 14, so that the delay times of the delay circuits 64, 65 required to accurately align the scanning spots 52 on the medium surface. In this case, the output of the detector means is applied to the delay circuits 64, 65 to control the timings of application of the green and red color image signals (voltage signals) to the respective modulators 24G and 24R in a feedback fashion. This arrangement permits compensation for a variation in the relative positions of the three scanning spots 52B, 52G and 52R which would be formed without the use of the delay circuits 64, 65. This variation may occur due to a change in the operating temperature or a variation in the relative position of the optical components of the color modulating portion 20 during use of the color exposing device.

The color modulating portion 20 of FIG. 8 may also be replaced by a single integrated optical component or assembly as shown in FIGS. 6 and 7.

Figure 12:
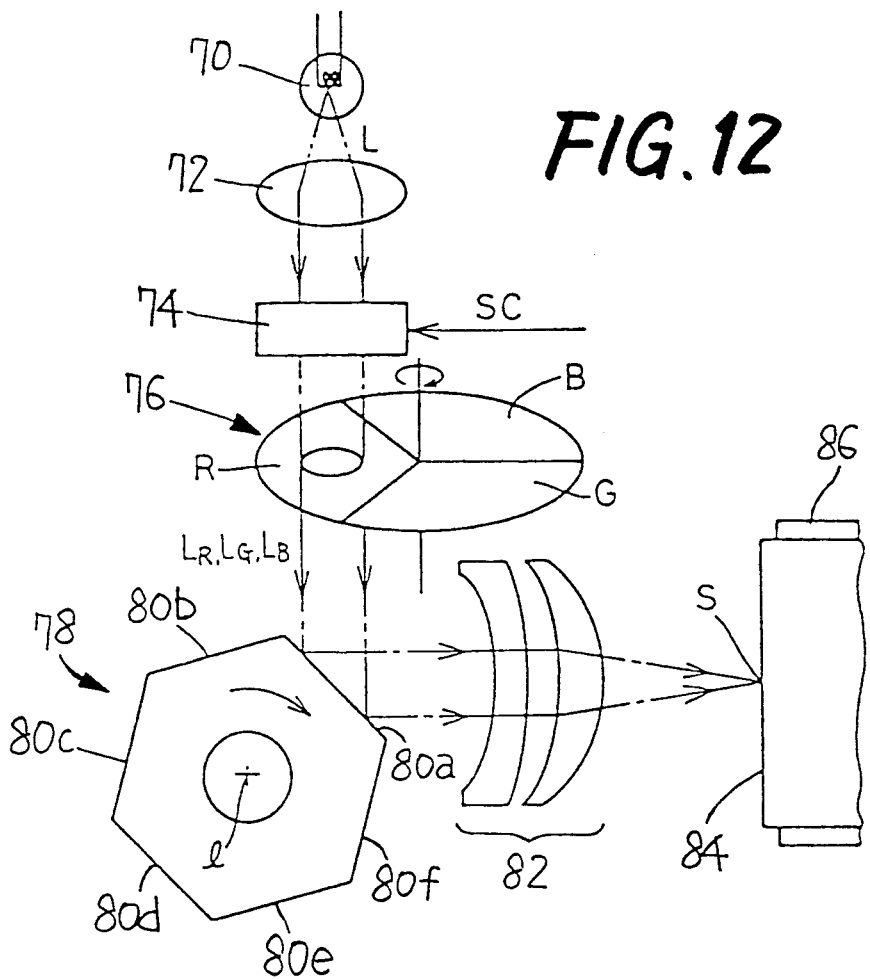
FIG. 12 is a schematic view showing a still further embodiment of the color exposing device of the present invention.

Reference is now made to FIG. 12, which shows a still further embodiment of the present invention. In the figure, reference numeral 70 denotes a metal halide lamp which produces a white radiation L having a wavelength band of about 400-700 nm. Like the metal halide lamps 10 and 41 used in the embodiments of FIGS. 1 and 8, the lamp 70 has a spectral energy distribution as indicated in FIG. 2. The white radiation L is transmitted through a collimator lens 72, and is incident upon an electro-optical modulator 74 using a PLZT crystal. The modulator 74 modulates the intensity of the incident radiation according to color image signals SC received from a suitable external device such as a color camera. The color image signals SC consist of a red image signal R, a green image signal G and a blue image signal B, which represent the proportions of red, green and blue colors of an image at each local spot along each scanning line on a recording medium in the form of a pressure-sensitive photosensitive sheet 84 which is fed by rotation of a platen roll 86. The sheet 84 is similar to the recording medium 14 used in the preceding embodiments. As described below, the red, green and blue image signals R, G, B for each scanning line are sequentially applied to the optical modulator 74, as the recording medium 84 is fed. Namely, the red image signal R is first applied to the modulator 74 for exposing the recording medium 84, to form a line of latent red images along a scanning line, and then the green and blue image signals are successively applied to the modulator 74 to form respective lines of latent green and blue images along the same scanning line. Thus, the three scanning operations are effected along the same scanning line, one after another, to form a line of latent images for full color imaging along the relevant scanning line according to the sequentially applied color image signals R, G, B. Since a page of images to be reproduced on the recording medium consists of two or more lines of images, the above color scanning or exposing operation cycle is repeated according to a batch of color image signals R, G, B.

Figure 15:
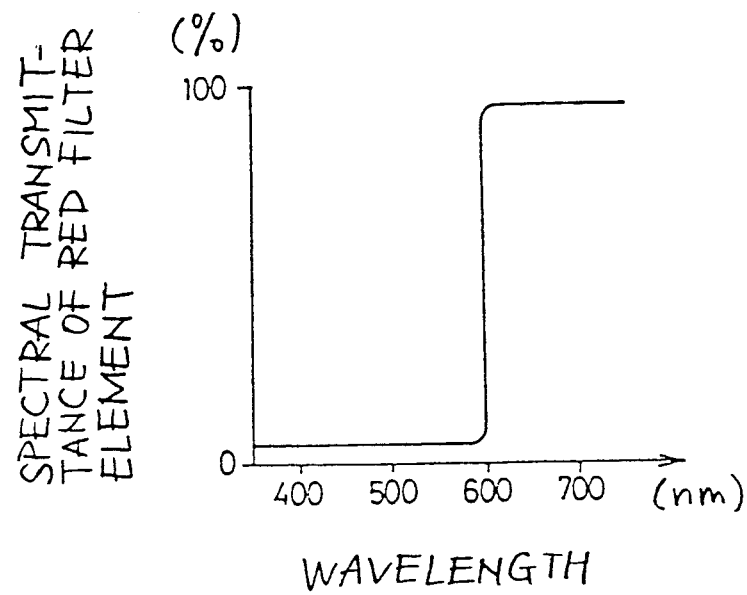
Figure 16:
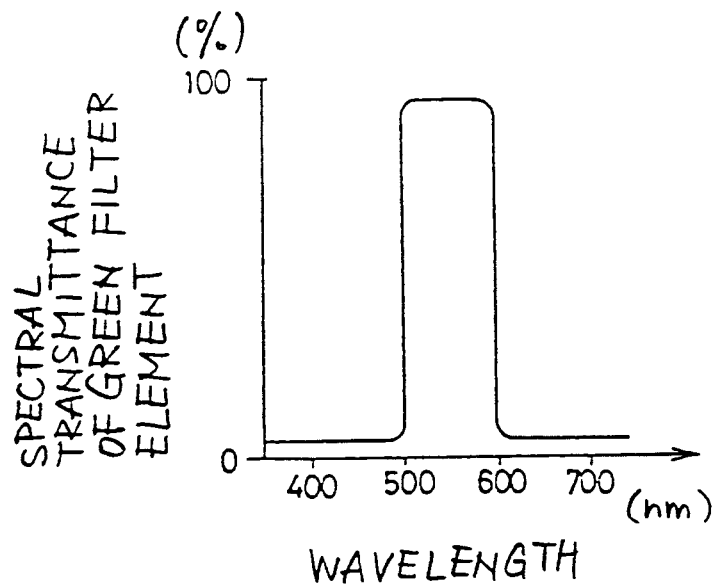
Figure 18:
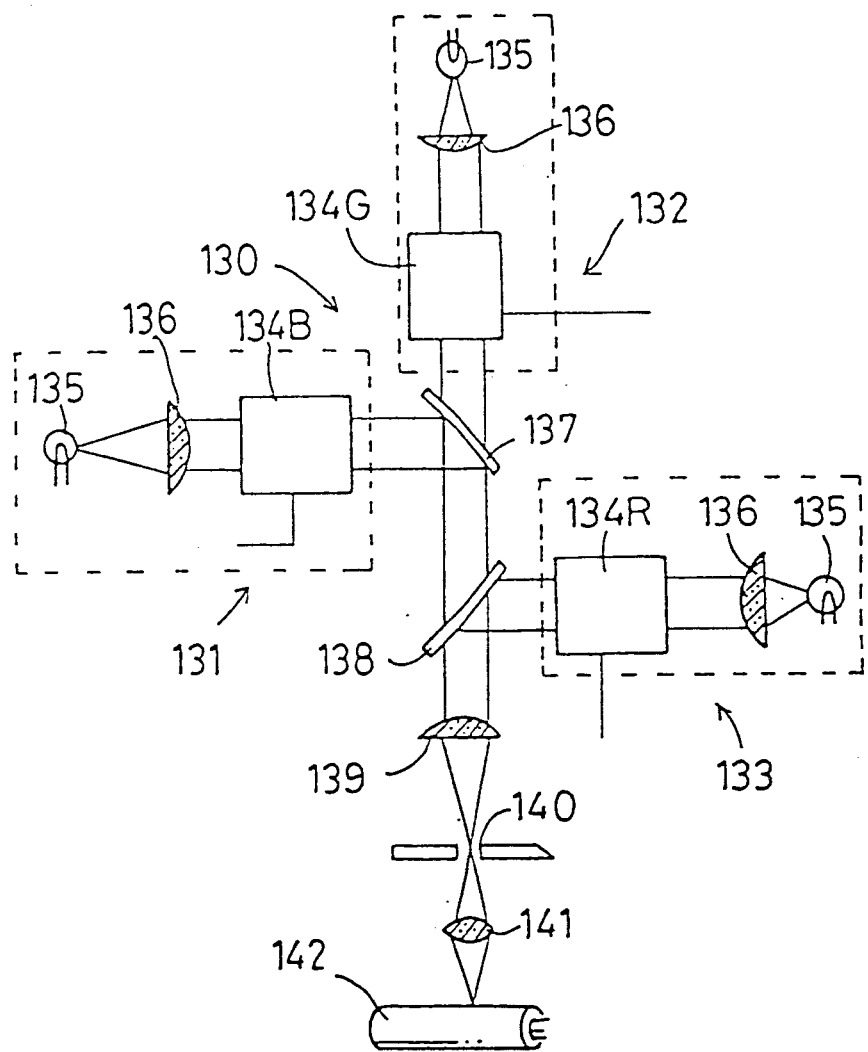
FIG. 18 is a schematic view showing a conventional color exposing device for a color imaging apparatus.

The white radiation color-modulated by the optical modulator 74 as described above is incident upon a disc-like color filter 76 which is rotated about an axis thereof and which is circumferentially divided into three filter elements, i.e., red filter element R, green filter element G and blue filter element B. Each of these three filter elements R, G, B covers a 120° division of the circumference of the filter 76, and is selectively and sequentially brought into the operative position, by rotation of the filter 76, in accordance with the currently applied color image signal R, G, B. The filter elements R, G, B transmit the respective red, green and blue wavelength components of the incident white radiation, respectively, when the elements R, G, B are selectively placed in the operative position aligned with the light path passing through the filter 76. The spectral transmittance distributions of these filter elements R, G, B are illustrated in the graphs of FIGS. 15, 16 and 17, respectively.

The wavelength components which are transmitted through the color filter 76 are incident upon a polygon mirror 78, as three modulated light beams LR, LG, LB. The polygon mirror 78 is a hexagonal prism having six plane reflecting surfaces 80$a$-80$f$. These six reflecting surfaces 80$a$-80$f$ are classified into three groups or sets, a first set consisting of the surfaces 80$a$, 80$d$, a second set consisting of the surfaces 80$b$, 80$e$, and a third set consisting of the surfaces 80$c$, 80$f$. The first set 80$a$, 80$d$ is used to reflect the red light beam LR, the second set 80$b$, 80$e$ to reflect the green light beam LG, and the third set 80$c$, 80$f$ to reflect the blue light beam LB. As the polygon mirror 78 is rotated about the axis 1 at a predetermined constant angular velocity, the light beams LR, LG, LB are reflected by the respective reflecting surfaces 80$a$, 80$d$; 80$b$, 80$e$; 80$c$, 80$f$, and the reflected light beams LR, LG, LB are deflected over a predetermined angular range in a plane perpendicular to the rotation axis of the polygon mirror 78 (in a plane parallel to the rotation axis of the platen roll 86). While the filter element R is placed in the operative position, for example, the modulated light beam LR is reflected and deflected in the above-indicated plane, by the reflecting surface 80$a$ or 80$d$.

The reflected and deflected light beams LR, LG, LB are transmitted through an f$\theta$ lens 82 and converged on the surface of the photosensitive recording medium 84 on the platen roll 86. The f$\theta$ lens 82 permits the light beams LR, LG, LB to be deflected at a constant speed over the predetermined angular range, in the scanning direction parallel to the axis of the platen roll 86. As a result, a scanning spot S formed on the recording medium 84 by each modulated light beam is moved in the scanning direction at the constant speed over the entire width of the recording medium 84.

The pressure-sensitive photosensitive recording medium 84 is continuously fed by the platen roll 86 at a predetermined speed, in a feeding direction which is perpendicular to the scanning direction. That is, the rotation axis of the platen roll 86 is parallel to the scanning direction in which the modulated light beams LR, LG, LB are deflected by the rotation of the polygon mirror 78. The scanning or exposing operations with the three modulated light beams LR, LG, LB are effected for each of parallel scanning lines parallel to the rotation axis of the platen roll 86, so that lines of latent images are formed for one page of image, as the recording medium 84 is continuously fed.

Figure 13:
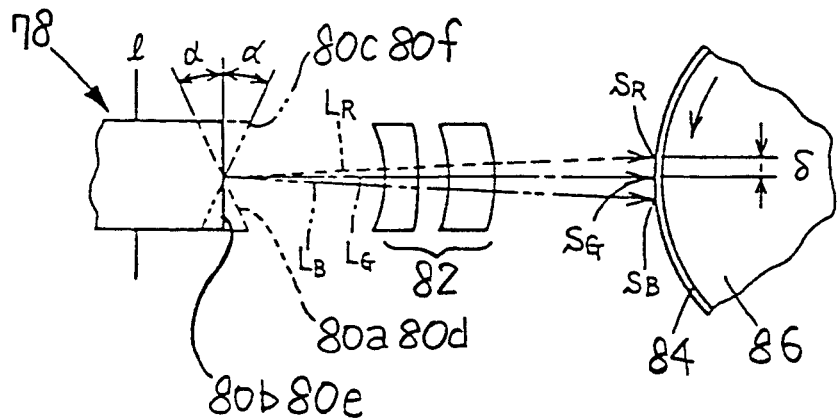
FIG. 13 is a fragmentary view of the device of FIG. 12, taken in a direction parallel to the rotation axis of a platen roll of the device.

Referring to FIG. 13, there are shown the polygon mirror 78, f$\theta$ lens 82, recording medium 84 and platen roll 86 as seen in the direction parallel to the rotation axis of the platen roll 86. As indicated in solid line in FIG. 13, the plane reflecting surfaces 80$b$, 80$e$ of the polygon mirror 78 for deflecting the modulated green light beam LG in the direction parallel to the rotation axis of the platen roll 86 are formed parallel to the rotation axis 1 of the polygon mirror 78. However, the plane reflecting surfaces 80*a*, 80*d* for reflecting the modulated red light beam LR are inclined relative to the rotation axis 1 of the polygon mirror 78 by an angle α, as indicated in dashed line in FIG. 13. Further, the plane reflecting surfaces 80*c*, 80*f* for deflecting the modulated blue light beam LB are inclined relative to the rotation axis 1 by the same angle as the reflecting surfaces 80*a*, 80*d*, but in the opposite direction with respect to the reflecting surfaces 80*a*, 80*d*, as indicated in one dot chain line in FIG. 13. In this arrangement, a scanning spot SR formed on the medium 84 by the red light beam LR is spaced apart by a distance δ from a scanning spot SG formed by the green light beam LG, in the direction opposite to the feeding direction of the medium 84, if the medium 84 was irradiated by the light beams LR and LG at the same time and if the medium 84 is not fed. Similarly, a scanning spot SB formed by the blue light beam LB is spaced apart by the same distance δ from the scanning spot SG, in the feeding direction of the medium 84.

The relationship between the inclination angle α of the reflecting surfaces 80*c*, 80*f*, 80*b*, 80*e* and the spacing distance δ of the scanning spots SG, SR, SB is represented by the following equation (1):

$$\tan 2\alpha = \delta/f \quad (1)$$

where, f: focal length of the fθ lens 82

The angle α is determined based on the rotating speed and diameter of the platen roll 86 and other factors, so that the distance of feed of the recording medium 84 in the direction parallel to the rotation axis of the polygon mirror 78 during each scanning operation by the corresponding reflecting surface 80 is equal to the spacing distance δ. The spacing distance δ or the corresponding feed distance of the medium 84 is selected to be almost equal to one-third (⅓) of the scanning spots S of the modulated light beams LR, LG, LB. If the scanning spots S have a diameter of 80 μm and the fθ lens 82 has a focal length f of 100 mm, the inclination angle α of the reflecting surfaces 80*c*, 80*f*, 80*b*, 80*e* is about 29" (about 0.008°), according to the equation (1).

FIGS. 14(*a*) through 14(*d*) illustrate the absolute scanning or exposing positions of the three modulated light beams LR, LG, LB, and the feeding movements of the recording medium 84, each movement by the distance δ after each scanning operation. While the absolute scanning or exposing positions of the three light beams LR, LG, LB are offset from each other in the right direction as seen in FIGS. 14, the same area on the recording medium 84 is exposed to the three light beams, since the medium 84 is fed by the incremental distance δ during one scanning or exposing operation with each light beam LR, LG, LB. Namely, the lines of the scanning spots SR, SG, SB formed on the medium surface are superposed on each other on the same scanning line on the medium surface.

Further, since the diameter of the scanning spots S is almost three times the feeding distance δ (spacing distance between the absolute positions of the adjacent scanning spots SR, SG, SB), the feeding of the medium 84 by the total distance of 3δ to effect the three scanning operations with the three light beams LR, LG, LB permits the medium 84 to be positioned for the next scanning cycle for the next line of images. Thus, the lines of the scanning spots formed on the medium surface with the repeated scanning cycles for successive lines of images cover the medium surface, without gaps between the lines of the scanning spots (lines of images). It is noted that the diameter of the spots S defines or determines the scanning pitch which is a distance between adjacent scanning lines (lines of images) on the medium 84. The feed distance δ is one-third (⅓) of the scanning pitch.

It will be understood from the foregoing description of the present embodiment that the plane reflecting surfaces 80*a*–80*f* of the polygon mirror 78 serve not only as scanning means for deflecting the light beams LR, LG, LB in the scanning direction perpendicular to the rotation axis 1 of the mirror 78, but also as deflecting means for permanently deflecting the light beams LR, LG, LB in the feeding direction parallel to the rotation axis 1, so that the lines of the scanning spots SR, SG, SB formed on the medium surface are superimposed on each other or aligned with the same scanning line on the medium surface, as the recording medium 84 is continuously fed at the constant speed while the medium surface is irradiated with the light beams at the predetermined time interval. Accordingly, each scanning line on the medium surface is scanned by the three light beams LR, LG, LB at different times, without the lines of scanning spots SR, SG, SB being offset in the feeding direction, whereby the accuracy of reproduction of images is improved although each scanning cycle consisting of three scanning operations with the three light beams is effected while the recording medium 84 is continuously fed at the constant speed.

The above advantage is obtained by simply forming the polygon mirror 78 such that the reflecting surfaces 80*a*, 80*d*, 80*c*, 80*e* are inclined by the angle α with respect to the rotation axis 1 as described above. No exclusive components or no modifications of the other components are required to offset the absolute positions of the scanning spots SR, SG, SB relative to the circumference of the platen roll 86. Therefore, the above arrangement may be readily applied to a conventional color exposing device using a polygon mirror. The present color exposing device is similar in construction and available at a lower cost, than a device wherein the platen roll (86) is held stationary while a scanning cycle with the three light beams is completed.

Although the polygon mirror 78 has the six plane reflecting surfaces 80*a*–80*f*, the number of the reflecting surfaces 80 may be suitable changed, provided that the number is a multiple of the number of the modulated light beams, i.e., a multiple of 3. That is, the polygon mirror 78 may have only three reflecting surfaces 80, or nine or twelve reflecting surfaces 80.

In the embodiment of FIGS. 12 and 13, the polygon mirror 78 for scanning in the direction perpendicular to the feeding direction also serves as the means for permanently deflecting the light beams LR, LG, LB in the feeding direction. However, the permanently deflecting means may be provided by a member or members separate from the polygon mirror 78.

The electro-optical modulator 74 may be replaced by an acousto-optical modulator or a liquid crystal shutter which is operated according to color image signals. Further, the optical modulator 74 may be disposed between the color filter 76 and the polygon mirror 78, so that the wavelength components of the white radiation that are passed through the filter 76 are modulated by the modulator 74.

Although the recording medium 84 is fed by the platen roll 86, a planar platen may be used so that the medium 84 is fed flat while being supported by the planar platen. Further, the beam scanning direction of the polygon mirror 78 and the feeding direction of the recording medium 84 need not be perpendicular to each other, but may intersect each other at a suitable angle. For example, the scanning direction may be slightly inclined with respect to the rotation axis of the platen roll 86.

While the present invention has been described in the presently preferred embodiments with a certain degree of particularity, it is to be understood that the invention is not limited to the details of the illustrated embodiments, but may be otherwise embodied, with various changes and modifications other than those indicated above.

For example, the microcapsules of the pressure-sensitive photosensitive recording medium 14, 84 may use a resin which is softened rather than cured, upon exposure to light.

The light source or lamp 10, 41, 70 may have a spectral energy distribution characteristic different from that indicated in FIG. 2. The recording medium 14, 84 may have a spectral sensitivity characteristic different from that indicated in FIG. 5. Further, the selectively reflecting films 28, 29 used in the color modulating portion 20 of the embodiments of FIGS. 1 and 8 may have spectral reflectance characteristics different from those indicated in FIGS. 3(a), 3(b) and 3(c), and the filter elements of the color filter 76 used in the embodiment of FIG. 12 may have spectral transmittance characteristics different from those of FIGS. 15-17.

The invention may be embodied with various other changes, modifications and improvements, which may occur to those skilled in the art, without departing from the spirit and scope of the invention defined in the following claims.

What is claimed is:

1. A color exposing device for imagewise scanning a photosensitive recording medium with a plurality of light beams corresponding to a plurality of colors, respectively, said recording medium having a plurality of photosensitive materials which are sensitive to respective bands of wavelength of said light beams, to produce images in said plurality of colors, said device comprising:

a light source for producing a single radiation including a plurality of wavelength components whose wavelengths fall within said respective bands of wavelength of light beams;

a color separation element for separating said radiation into said plurality of wavelength components to provide said plurality of light beams, respectively, such that said light beams are propagated along respective light paths;

a plurality of optical modulators disposed in said light paths, respectively, for modulating intensities of said light beams according to respective color image signals corresponding to said plurality of colors, respectively, to thereby provide respective modulated light beams;

scanning means for irradiating a surface of said recording medium with said modulated light beams, along a line on said surface, to produce a line of color images in said plurality of colors;

color combining means for combining said modulated light beams into a composite exposing radiation such that said modulated light beams of said composite exposing radiation are propagated through respective light paths leading to said scanning means, optical axes of said light paths leading to said scanning means being offset with respect to each other so that scanning spots of said modulated light beams formed on said surface of the recording medium by said scanning means are offset from each other along a scanning line in a scanning direction of said scanning means; and delay means connected to said optical modulators, for delaying a time at which at least one of said color image signals is applied to a corresponding at least one of said optical modulators, so that said scanning spots of said modulated light beams for a same local spot on said surface of the recording medium are aligned with each other at said same local spot on said scanning line on the surface of the recording medium.

2. A color exposing device according to claim 1, wherein said light source comprises a metal halide lamp.

3. A color exposing device according to claim 1, wherein said light source comprises a metal halide lamp, an elliptical mirror having a focal point at said metal halide lamp, a concave lens for converting a light produced by said metal halide lamp and reflected by said elliptical mirror, into substantially parallel rays, a stop having an aperture, and a conical lens having a translucent projection which extends through said aperture, said conical lens receiving said substantially parallel rays and emitting through said projection said radiation to be incident upon said color separation element.

4. A color exposing device according to claim 1, wherein said color separation element comprises a color separation prism which has a plurality of selectively reflecting films for reflecting therefrom and/or transmitting therethrough said plurality of wavelength components as said plurality of light beams such that said light beams are propagated along said respective light paths.

5. A color exposing device according to claim 1, wherein said color combining means comprises a color combining prism which has a plurality of selectively reflecting films for reflecting therefrom and/or transmitting therethrough said respective modulated light beams such that said optical axes of said modulated light beams of said composite exposing radiation are parallel to and offset from each other.

6. A color exposing device according to claim 1, wherein each of said plurality of optical modulators includes a PLZT crystal which exhibits an electro-optic effect when said PLZT crystal receives a corresponding one of said color image signals.

7. A color exposing device according to claim 1, wherein said plurality of photosensitive materials of said recording medium comprise a first, a second and a third group of microcapsules which include respective radiation-curable resins which are cured upon exposure to said respective bands of wavelength of light beams, and respective chromogenic materials corresponding to yellow, magenta and cyan which are contained in said respective radiation-curable resins, said surface of said recording medium carrying a layer consisting of a mixture of said first, second and third groups of microcapsules.

8. A color exposing device according to claim 1, wherein said scanning means comprises a polygon mirror for reflecting said composite exposing radiation over a predetermined angular range along said line on said surface of the recording medium, and an $f\theta$ lens through which said composite exposing radiation reflected by said polygon mirror is transmitted, such that a scanning speed of said exposing radiation along said line is constant.

9. A color exposing device according to claim 8, wherein said color combining means comprises a plurality of reflecting mirrors for reflecting at least one of said plurality of wavelength components received from said color separation element as said plurality of light beams so that optical axes of said light beams intersect each other such that said light beams irradiate a same area on each reflecting surface of said polygon mirror.

10. A color exposing device according to claim 1, wherein said color separation element, said optical modulators and said color combining means are optically coupled with each other as a single integrated optical assembly.

11. A color exposing device for imagewise scanning a photosensitive recording medium with a plurality of signal-controlled modulated light beams corresponding to a plurality of colors, respectively, said recording having a plurality of photosensitive materials which are sensitive to respective bands of wavelength of said light beams, to produce images in said plurality of colors, said device comprising:
feeding means for feeding said recording medium at a predetermined constant speed in a feeding direction;
time-sharing modulating means for producing said signal-controlled modulated light beams at a predetermined time interval which is determined by a scanning pitch between adjacent scanning lines that are spaced apart from each other in said feeding direction;
a scanning means for sequentially irradiating a surface of said recording medium with said modulated light beams at said predetermined time interval, along each scanning line in a scanning direction intersecting said feeding direction; and
deflecting means for deflecting said modulated light beams by different angles in said feeding direction such that lines of scanning spots of the modulated light beams formed on said surface of the recording medium are superimposed on each other on the same scanning line, as said recording medium is fed at said constant speed while said surface is irradiated with said deflected modulated light beams at said predetermined time interval for said each scanning line by said scanning means.

12. A color exposing device according to claim 11, wherein said scanning means comprises a polygon mirror having a plurality of plane reflecting surfaces for reflecting said plurality of modulated light beams, respectively, said polygon mirror being rotated about an axis thereof to deflect the reflected modulated light beams along said each scanning line, said plane reflecting surfaces being inclined at different angles with respect to said axis of rotation, so that said plane reflecting surfaces serve as said deflecting means for deflecting said reflected modulated light beams in said feeding direction.

13. A color exposing device according to claim 12, wherein said plurality of modulated light beams consist of three signal-controlled modulated light beams corresponding to three colors, said plurality of plane reflecting surfaces of said polygon mirror consisting of three groups of reflecting surfaces corresponding to said three modulated light beams, each of said three groups consisting of reflecting surfaces whose number is a multiple of three, said scanning pitch in said feeding direction is substantially three times as large as a feeding distance of said recording medium which corresponds to each one of said three modulated light beams.

14. A color exposing device according to claim 11, wherein said plurality of photosensitive materials of said recording medium comprise a first, a second and a third group of microcapsules which include respective radiation-curable resins which are cured upon exposure to said respective bands of wavelength of light beams, and respective chromogenic materials corresponding to yellow, magenta and cyan which are contained in said respective radiation-curable resins, said surface of said recording medium carrying a layer consisting of a mixture of said first, second and third groups of microcapsules.

15. A color exposing device according to claim 11, further comprising a light source for producing a white light including wavelength components corresponding to said plurality of colors, and wherein said time-sharing modulating means comprises means for generating a plurality of color image signals corresponding to said plurality of colors, at said predetermined time interval, and an optical modulator for modulating intensities of said wavelength components according to said color image signals, respectively, at said predetermined time interval.

16. A color exposing device according to claim 15, wherein said white light including three wavelength components corresponding to three colors, and said plurality of color image signals consist of three color image signals, said time-sharing modulating means further comprising a color filter which has three filter elements which are selectively placed in an operating position at said predetermined time interval, said three filter elements receiving said three wavelength components so as to provide three modulated light beams.

17. A color exposing device according to claim 16, wherein said optical modulator is disposed between said light source and said color filter, so that said three wavelength components are modulated by said optical modulator before said three modulated light beams are passed through said three filter elements, respectively.

* * * * *